(12) United States Patent
Wendt

(10) Patent No.: US 8,839,289 B2
(45) Date of Patent: Sep. 16, 2014

(54) METHOD AND APPARATUS FOR REPRODUCING AUDIO AND/OR VIDEO DATA FOR USE IN AT LEAST ONE CHECKOUT ENVIRONMENT

(76) Inventor: Jan Wendt, Hamburg (DE)

( * ) Notice: Subject to any disclaimer, the term of this patent is extended or adjusted under 35 U.S.C. 154(b) by 210 days.

(21) Appl. No.: 13/363,556

(22) Filed: Feb. 1, 2012

(65) Prior Publication Data
US 2012/0198505 A1 Aug. 2, 2012

(30) Foreign Application Priority Data

Feb. 2, 2011 (EP) .................................. 11153013

(51) Int. Cl.
| | | |
|---|---|---|
| *H04H 60/33* | (2008.01) | |
| *H04N 7/10* | (2006.01) | |
| *H04N 7/025* | (2006.01) | |
| *G11B 27/10* | (2006.01) | |
| *H04N 21/235* | (2011.01) | |
| *H04N 21/231* | (2011.01) | |
| *H04N 21/254* | (2011.01) | |
| *H04N 21/262* | (2011.01) | |
| *H04N 21/2543* | (2011.01) | |
| *G11B 27/32* | (2006.01) | |

(52) U.S. Cl.
CPC .......... *G11B 27/105* (2013.01); *H04N 21/2358* (2013.01); *H04N 21/23109* (2013.01); *H04N 21/2542* (2013.01); *H04N 21/26258* (2013.01); *H04N 21/25435* (2013.01); *H04N 21/26241* (2013.01); *G11B 27/322* (2013.01)
USPC ................................................. 725/32; 725/9

(58) Field of Classification Search
CPC ................... H04N 21/23109; H04N 21/2358; H04N 21/2542; H04N 21/25435; H04N 21/26241; H04N 21/26258
USPC ........................................... 725/9, 32, 74–83
See application file for complete search history.

(56) References Cited

U.S. PATENT DOCUMENTS

| 6,038,545 A | * | 3/2000 | Mandeberg et al. ............ 705/15 |
| 7,519,703 B1 | | 4/2009 | Stuart et al. |
| 2006/0179078 A1 | | 8/2006 | McLean |

FOREIGN PATENT DOCUMENTS

| EP | 1 501 033 | 1/2005 |
| WO | 01 61612 | 8/2001 |
| WO | 2008 058296 | 5/2008 |

OTHER PUBLICATIONS

Areni, Charles S., Kim, David, "The Influence of Background Music on Shopping Behavior: Classical Versus Top Forty Music in a Wine Store," Advances in Consumer Research, 1993, vol. 20, eds. Leigh McAlister and Michael L. Rothschild, Provo, UT: Association for Consumer Research, pp. 336-340.

(Continued)

*Primary Examiner* — Dominic C Saltarelli
(74) *Attorney, Agent, or Firm* — Daniel A. Thomson; Emerson Thomson Bennett, LLC

(57) ABSTRACT

The invention involves a procedure and a system for reproducing or alternatively creating audio and/or video data in a location (12, 14, 16) in which sales are made, such as a restaurant or a business, which includes at least one data source (28) for audio and/or video data; at least one replay station (20); one control system (10), which is connected to the storage device and the replay station; at least one pay station (18), which is connected with the control system; at least one storage unit (30, 32); which control system creates correlation data sets from the data previously stored and contains a time correlation between the data that have been played. Or, alternatively between the applications and programs that created them and the pay station sales, and the control system takes account of these correlation data sets in replaying the data or in selecting the programs or applications.

20 Claims, 1 Drawing Sheet

(56) References Cited

OTHER PUBLICATIONS

North, Adrian C., Shilcock, Amber, Hargreaves, David J., "The Effect of Musical Style on Restaurant Customers' Spending," School of Psychology, University of Leicester, University Road, Leicester LE1 7RH, United Kingdom, Oct. 10, 2003, eBulletin, URL: www.le.ac.uk/press/ebulletin/news/havingtherighttaste.html.

Gueguen, Nicolas, Jacob, Celine, Lourel, Marcel, LeGuellec, Helene, "Effect of Background Music on Consumer's Behavior: a Field Experiment in a Open-Air Market," European Journal of Scientific Research, ISSN 1450-216X, vol. 16, No. 2, 2007, pp. 268-272, URL: www.eurojournals.com/ejsr.htm.

North, Adrian C., Hargreaves, David J., "The Effect of Music on Atmosphere and Purchase Intentions in a Cafeteria," Journal of Applied Social Psychology, 1998, 28, 24, pp. 2254-2273.

\* cited by examiner

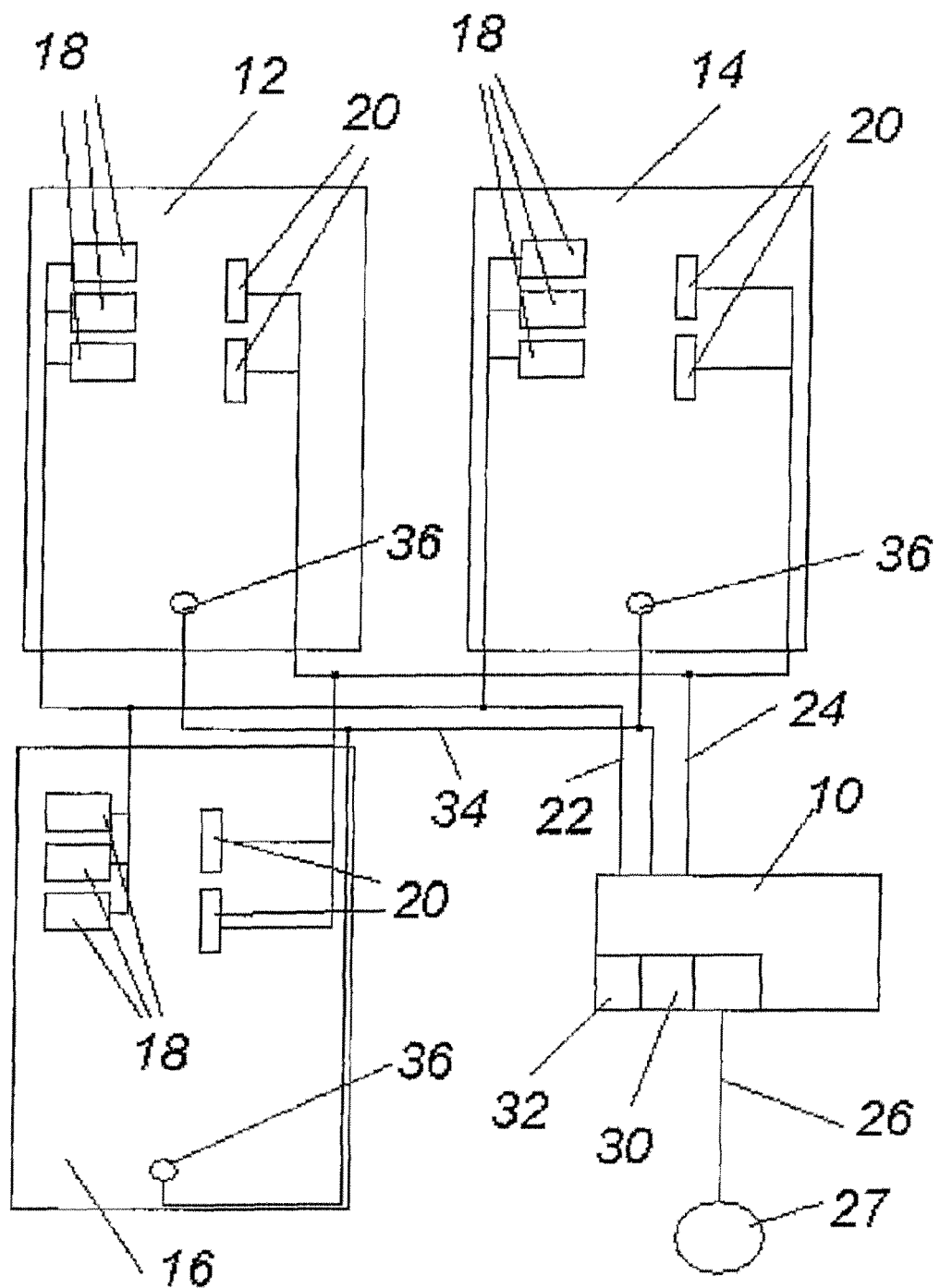

METHOD AND APPARATUS FOR REPRODUCING AUDIO AND/OR VIDEO DATA FOR USE IN AT LEAST ONE CHECKOUT ENVIRONMENT

BACKGROUND

This invention involves a system and a procedure for reproducing audio and/or video data or providing these data for use in applications (short form: Apps for games or other computer programs) in inter-active end devices in a location having at least one pay station, such as in a restaurant.

DESCRIPTION OF THE RELATED ART

Currently restaurants and hospitality rooms at times, play video clips such as music videos for the entertainment of their guests. Sometimes interactive end-user devices, such as game consoles, are set up in these spaces and on which apps run in order to increase attractiveness to customers. The ultimate purpose of this entertainment is to increase sales in the particular restaurant, such as that by increasing the time that people remain in the location.

The basis of this invention is to allow a more effective increase in sales or in time spent in the location as the result of playing audio and/or video data.

SUMMARY

According to the invention, sales at the pay station are recorded over time. In the same way, the audio and/or video data that are played are also recorded over time, such as in the form of a play list. For this purpose, at least one pay station and the audio and/or video replay device (EN) are connected to a central control system, which firstly records the time at which the pay station sales and the audio and/or video data that are played are recorded, and secondly establishes a correlation among these data. On the basis of the correlation in time between pay station sales and the audio and/or video data that are played, one can establish whether and which audio and/or video data lead to an increase in pay station sales and which do not. In this way, the correlation data can be used for the future playing of those audio and/or video data that positively affect sales. Alternatively or in addition to the pay station sales, the period of time spent by those people in the premises can be recorded, for example, by means of sensors, and can be used for generating the correlation data for time spent in the premises. In this way one can determine which audio and/or video data or which programs or applications that create them lead to a greater amount of time spent in the premises.

Preferentially the audio and/or video data are played as music clips, audio clips, or music videos. However, a live TV picture or a sports program can also be played. In the case of presenting television programs, the data source can be a television or radio program, such as land-line cable or satellite radio or TV. If the end devices are hybrid devices, such as computers or game consoles, the data source for the audio and/or video data is an application.

The correlation data do not necessarily have to extend to the audio and/or video data themselves, but can relate to the programs, such as television programs or applications, like computer or game station applications, which in the end create the audio and/or video data. Thus the parameters can be the choice of a particular television program or the selection of a particular game (application). In this case the correlation data naturally do not relate to the generated audio and/or video data or to those data supplied by the program, but to the programs or the applications themselves. Here a correlation between the program channel or the game and the pay station sales is made.

Preferentially the number of people in the premises, such as in the restaurant, is recorded in order in this way to be able to get a corrected correlation, since the sales at the pay station naturally also depend on the number of visitors to the premises. By including the number of visitors, one can normalize the time-specific correlation data that are found between the pay station sales and the audio and/or video data per consumer. The corrected pay station sales then no longer depend on the numbers patronizing the restaurant. In addition, the recording of the number of people found on the premises also tells the amount of time that the persons have spent in the premises, and as a result there is a second correlation between playing the audio and/or video data and the amount of time spent by the persons on the premises. This correlation of the amount of time spent on the premises can also be used to positively affect the amount of time spent on the premises by the persons there and in the end also to have a positive effect on sales.

In order to be able to record the desired data, preferably an electronic pay station is used as the pay station, from which the sales are transferred directly to the control system.

In order for the control system to identify the pay stations for various premises and to associate the environments, it is advantageous to identify the data from a particular pay station with an ID specific to the pay station.

Preferentially, the pay stations are connected with the control program via a serial communication connection.

The replay station for the audio and/or video data can be a video replay station or a television, such as one that includes one or several screens. Preferably it has a central data source for the audio and/or video data, such as a DVD or CD player or hard disk memory. For storing the replayed audio and/or video data, however, other types of standard storage devices can be used, such as semi-conductor storage devices. Replaying occurs on the corresponding DVD player, CD player, or hard drive player. It is also possible to obtain the audio and/or video data from an external server via a communication network such as the Internet. One can also set up a local storage device for the audio and/or video data, such as a hard drive storage device with new video clips received over the communication network.

The replay station can also be a hybrid end device, which allows interaction, such as game consoles or computers. In addition, various types of replay stations can be provided on the premises, such as game consoles and monitors for replaying music videos, or live TV content. The correlation for hybrid end devices does not necessarily take place between pay station sales and the replayed audio and/or video data, but rather also between the pay station sales and the programs or applications that create the audio and/or video data, for example, specific programs on the computer or specific games on a console.

In principle, one central control system can be used for each environment. However, one central control system can also be used for several or various premises, such as a department store and an attached restaurant. In this case, the video replay stations and the pay stations must be provided with an ID in order to allow the control system to undertake a spatial association for the premises.

In principle, the control system must not necessarily be provided centrally, but can also be planned in a decentralized fashion on the premises, or connected to the premises, such as by being integrated into the individual replay devices and/or pay stations.

The time recording can be kept by the minute or alternatively by the day, and/or can be exact according to specific events, and as a result one has not only the absolute correlation to the particular time of day down to the minute, but also has a correlation for events such as holidays, Christmas, Easter, etc.

In addition to the use of the time-related correlation data that are found between the audio and/or video data and the pay station sales, the control system for the replay of the audio and/or video files can be used not only on the premises, but these data can also be transferred to a central location, which uses this information for other locations. The number of persons on the premises can be recorded through recognized recording systems, such as infrared sensors or cameras with the appropriate software.

The preferred form of this control system is a system controlled by a microprocessor, such as a personal computer.

The control system and the replay station for the audio and/or video files as well as the data source in which the audio and/or video files are stored can also be connected with each other through the appropriate communication connections, such as HDMI, SCART, or other video transfer standards.

Of course each location can have several pay stations and replay stations.

Even if there is preferably only one data source for the audio and/or video files in the system or on the premises, it is also possible to envisage several data sources. Moreover, different audio and/or video data may be replayed at various places in the premises, something that naturally is registered in the control system and correlated with the particular local pay stations. It is then obvious that only the audio and/or video files that can stand in a limited time relationship to the particular pay station or stations points are used for the creation of the time correlation. An appropriate parameter for this is the hearing area or the visual area of the replay device.

Preferentially the play list, pay station sales, and correlation data as well as correlation data for time spent on the premises can be stored in the second and third storage device and can be transferred for further use to an external server by an Internet connection.

BRIEF DESCRIPTION OF THE DRAWINGS

At least one embodiment of the invention is set forth in the following description and is shown in the drawings and is particularly and distinctly pointed out and set forth in the appended claims.

FIG. 1 is a diagram of the present invention.

The invention will now be described on the basis of the schematic drawing. This depicts a system with a control system 10 and three various premises 12, 14, 16.

For example, the first premises 12 can be a food store in a shopping center, while reference 14 can be a restaurant situated in the shopping center and 16 can be a boutique in the shopping center. In each of these environments, three pay stations 18 are provided and two replay stations for music videos 20. The pay stations are connected via a serial communication line 22 with the control system 10, to which the music replay stations are connected by the corresponding video communication cables 24, which run to the control system. The control system also has a connection 26 to the Internet, in order to exchange online audio and/or video data or to update such data and/or to obtain such data. The control system 10 includes as well a first data storage device 28 for audio and/or video data, a second data device 30 for recording the time of cash point sales and played video clips (playlist), and a third storage device 32 for storing the correlation data calculated by the control system.

Moreover, sensors 36 for recording persons are connected via a communication interface 34 with the control system 10, in which one or more of the sensors 36 in the particular businesses or restaurants 12, 14, 16 can be provided for each location. These data are used either for correcting the correlation data or for receiving the correlation data that are corrected (independent) for the number of persons found in the particular businesses. Alternatively or additionally the sensors can record the correlation between the music videos that are played (play list) and the amount of time spent in the premises by the people there.

The system works as follows: During business hours in the three businesses, music clips are played back over the replay stations 20. The music clips can be identical or different in the three businesses 12, 14, 16. The time sequence of the video clips is stored in the second storage device 30. At the same time, the sales that take place at the pay stations 18 are recorded over time by the control system 10 and stored in the second storage device 30. Correlation data are created from these data, which are stored in the third storage device 32. Optionally, corrected correlation data may be stored in the third storage device 32 along with the correlation data noted above, in which the number of persons recorded by the sensors 36 can be considered in order to get the corrected correlation data per visitor. These correlation data in the third storage device 32 are used for control of the replay station and the data storage device 28, in which a triggering is activated in such a way that the music or video clips that accompany particularly high sales are played more often.

Through the recording of the number of persons by the sensors 36, the time spent by persons on the premises 12, 14, 16 can be determined. These can also be correlated to the stored play list in the second storage device 30 (the audio and/or video data played over time) in order to obtain correlation data for the amount of time spent in the premises, in which the amount of time spent in the premises is correlated with the audio and/or video data that are played. These correlation data for time spent in the premises are preferentially stored in the third storage device 32. In this way, it is also possible to have a positive effect on the time spent in the premises, something that in turn generally has positive effects on the growth of sales.

DETAILED DESCRIPTION

In this way, the invention is particularly suited to improve sales in various types of businesses.

It should be made clear in the application that the control system can be set up centrally or can be decentralized. The control system can also be set up either in the premises or at another location. In this way, an Internet connection can for example be set up with the control system. It is hereby only important that the storage devices from which the audio and/or video data are replayed are connected in real time to the premises.

In the example given above, it should be made clear that the number of premises is not relevant to the invention, nor is the number of pay stations 18 or replay stations 20 that are found in the premises 12, 14, 16. The central control system can be set up centrally or in a decentralized fashion in the premises. The storage devices that are noted can be the storage areas inside the control system computer, or semiconductor memory, or alternatively hard disks, or external storage media.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplifications presented hereinabove. Rather, what is intended to be covered is within the spirit and scope of the appended claims.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

The invention has been described with reference to several embodiments. Obviously, modifications and alterations will occur to others upon a reading and understanding of the specification. It is intended by applicant to include all such modifications and alterations insofar as they come within the scope of the appended claims or the equivalents thereof.

I claim:

1. System for replaying or creating audio and/or video data in a premises in which sales are made, the system comprising:
    at least one data source for audio and/or video data or at least one replay station for audio and/or video data;
    a control system, which is connected to at least one storage device or the replay station;
    at least one pay station connected with the control system;
    at least a second storage device, which is designed for storing at least one of the group comprising pay station sales, the audio and/or video data, programs, and applications that create the data, wherein the control system creates sets of correlation data from stored data, which have a temporal correlation between the played audio and/or video data or between the applications and programs that create these data and the cash point sales, and wherein the control of the correlation data-sets is taken into account for the playing of the audio and/or video data or in selecting programs or applications; and,
    at least a third storage device for storing the correlation data calculated by the control system, wherein the correlation data has a trigger to play audio and/or video data that had previously accompanied higher sales, wherein the trigger is automatically generated by the third storage device.

2. The system according to claim 1, wherein the control system has an apparatus for recording the number of persons in the premises, wherein corrected correlation data is created to determine corrected correlation data per visitor.

3. The system according to claim 2, wherein the control system takes into account the data from the recording device to create data-sets.

4. The system of claim 3, wherein the replay station is an interactive device, and the audio and/or video data are provided as part of an application.

5. The system of claim 3, wherein the data source is a data storage device.

6. The system of claim 5, wherein the pay station is an electronic pay station, which is connected to the control system over a serial interface.

7. The system of claim 6, wherein the storage unit for storing the correlation data sets is connected to the control system.

8. The system of claim 3, wherein the pay station is an electronic pay station, which is connected to the control system over a serial interface.

9. The system of claim 3, wherein the storage unit for storing the correlation data sets is connected to the control system.

10. The system according to claim 1 wherein the replay station is an interactive device and the audio and/or video data are provided as part of an application.

11. The system of claim 10, wherein the data source is a data storage device.

12. The system according to claim 1 wherein the data source is a data storage device.

13. The system according to claim 1 wherein the pay station is an electronic pay station, which is connected with the control system over a serial interface.

14. The system according to claim 1 wherein the storage device for storing the correlation data sets is connected with the control system.

15. A method for replaying audio and/or video data or for using the programs or applications that create the data in at least one location having a pay station, the method comprising the steps of:
    recording, using a first electronic data storage device, at least one of the group comprising the audio and/or video data, programs, and applications that are played back;
    recording, using a second electronic data storage device, at least one of the group comprising pay station sales, and an amount of time spent in the location by associated customers;
    establishing correlation data between play of the audio and/or video data or the programs and applications, and the recorded sales and/or the amount of time spent; and,
    utilizing a third electronic data storage device, controlling further play of the audio and/or video data or implementing the programs or applications using the correlation data, wherein the correlation data has a trigger to play audio and/or video data that had previously accompanied higher sales, wherein the trigger is automatically generated by the third storage device.

16. The method according to claim 15, wherein the audio and/or video data are video clips and music videos.

17. The method according to claim 15, wherein the method further comprises the steps of:
    utilizing electronic sensors, recording the number of persons in the location; and,
    using the number of persons for standardizing the correlation.

18. The method according to claim 17, wherein the method further comprises the step of:
    using the recorded number of persons for giving the time spent over time in the location; and,
    generating subsequent correlation data between the audio and/or video data that are played or the programs or applications that create the data and the time spent in the location, wherein the correlation data for the time spent in the location are used for the control of the replaying of the audio and/or video data or for running the programs or applications.

19. The method according to claim 18, wherein data regarding the correlation are stored in a storage device.

20. The method according to claim 15, wherein data regarding the correlation are stored in a storage device.

\* \* \* \* \*